(12) United States Patent
Fetizanan (10) Patent No.: US 9,541,210 B2
(45) Date of Patent: Jan. 10, 2017

(54) PIPELINE PRESSURE ISOLATION SYSTEMS AND DEVICES

(71) Applicant: FLUOR TECHNOLOGIES CORPORATION, Aliso Viejo, CA (US)

(72) Inventor: Pat F. Fetizanan, Katy, TX (US)

(73) Assignee: Fluor Technologies Corporation, Sugar Land, TX (US)

( * ) Notice: Subject to any disclaimer, the term of this patent is extended or adjusted under 35 U.S.C. 154(b) by 696 days.

(21) Appl. No.: 13/658,682

(22) Filed: Oct. 23, 2012

(65) Prior Publication Data

US 2014/0110001 A1 Apr. 24, 2014

(51) Int. Cl.
| | |
|---|---|
| F16K 31/12 | (2006.01) |
| F16K 27/04 | (2006.01) |
| F16K 3/26 | (2006.01) |
| F16K 17/30 | (2006.01) |
| F16K 17/34 | (2006.01) |

(52) U.S. Cl.
CPC ............. *F16K 27/041* (2013.01); *F16K 3/262* (2013.01); *F16K 17/30* (2013.01); *F16K 17/34* (2013.01); *Y10T 137/7796* (2015.04); *Y10T 137/9029* (2015.04)

(58) Field of Classification Search
CPC ..................................................... G05D 16/10
USPC ...... 137/460, 461, 462, 498, 505.13, 505.38
See application file for complete search history.

(56) References Cited

U.S. PATENT DOCUMENTS

| | | | | |
|---|---|---|---|---|
| 2,701,704 | A | * | 2/1955 | Lawrence ........................ 251/25 |
| 3,559,677 | A | * | 2/1971 | Barosko ................... 137/505.13 |
| 3,768,522 | A | * | 10/1973 | Leparskas ........................ 138/40 |
| 4,167,194 | A | | 9/1979 | Matsuda |
| 5,109,884 | A | * | 5/1992 | du Plessis ............... F16K 17/32 137/460 |
| 5,269,347 | A | | 12/1993 | Beasley |
| 6,164,927 | A | | 12/2000 | Wehage |
| 6,328,072 | B1 | | 12/2001 | Mahe et al. |
| 7,344,127 | B2 | | 3/2008 | Beck |
| 7,617,841 | B2 | * | 11/2009 | Zimpfer et al. ......... 137/505.13 |
| 2004/0084088 | A1 | | 5/2004 | Callies |
| 2010/0181519 | A1 | | 7/2010 | Li et al. |

FOREIGN PATENT DOCUMENTS

| | | |
|---|---|---|
| GB | 2431485 | 4/2007 |
| JP | 2012-86723 | 5/2012 |
| KR | 10-2010-0032709 A | 3/2010 |

OTHER PUBLICATIONS

Patent Cooperation Treaty, Notification of Transmittal of the International Search Report and the Written Opinion of the International Searching Authority, or the Declaration, PCT Application No. PCT/US2012/061496, issued Apr. 29, 2013.

* cited by examiner

*Primary Examiner* — R. K. Arundale
(74) *Attorney, Agent, or Firm* — Conley Rose, P.C.; Kristin Jordan Harkins (57) ABSTRACT

A pressure isolation device for a pipeline system is described. The pressure isolation device changes from an open position to a closed position when the pressure of a fluid flowing through the device exceeds a predetermined threshold pressure. In some embodiments, the predetermined threshold pressure is defined, in part, by a spring. The pressure isolation device provides a simple mechanical solution to protecting pipeline components from over-pressurization.

20 Claims, 6 Drawing Sheets

PIPELINE PRESSURE ISOLATION SYSTEMS AND DEVICES

FIELD OF THE INVENTION

The field of the invention is valves, more specifically, devices and systems for isolating pressure build-up in pipelines.

BACKGROUND

Pipelines for transporting oil, natural gas, water, and other important resources, are used globally and are an important part of commerce and infrastructure. Such pipeline systems generally rely on pumps and/or compressors to move fluid through the pipeline. If a blockage occurs downstream from a compressor, pressure will build-up in the pipeline and can lead to cracking, breakages, leaks, and environmental damage.

Several approaches to preventing pipeline pressure build-ups and breakages are known. One known solution is to include pressure safety valves ("PSV"). PSV's are configured to automatically open up at a predetermined pressure threshold, thus relieving (e.g., bleeding) pipeline pressure into the surrounding environment. PSV devices are considerably economical to manufacture and install, however, the cost of environmental damage and lost product (e.g., oil, water, natural gas, etc) is significant. Flares can be used to reduce damage to the environment.

Another approach to preventing pipeline overpressure is high integrity pressure protection systems ("HIPPS"). A typical HIPPS includes sensors for monitoring pipeline pressures and a control system for automatically shutting off the source of the overpressure (e.g., shutting off the compressor or closing a valve) when pipeline pressure passes a threshold value. HIPPS, however, have several drawbacks. First, the sensors and control system add significant costs to the pipeline. Second, sensors and control system components can degrade over time and are susceptible to weather damage.

Yet another approach to preventing pipeline breakage from pressure build-up is to use pipeline designs (e.g., diameters, thickness, joining processes, materials, etc.) that can handle the maximum pressure output of the compressor. However, this approach is economically impractical for long pipeline routes (e.g., oil transportation pipelines).

Examples of other devices and methods of preventing system overpressure can be found in GB2431485, U.S. Pat. No. 4,167,194, U.S. Pat. No. 5,269,347, U.S. Pat. No. 6,164,927, U.S. Pat. No. 7,344,127. Unfortunately, the devices and methods described in these references also suffer from similar drawbacks as the previously mentioned approaches.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for improved devices, systems, and methods for pressure isolation and/or overpressure prevention.

SUMMARY OF THE INVENTION

The inventive subject matter provides apparatus, systems and methods in which pipeline segments can be isolated from one another using pressure isolation devices (e.g., shutoff valves) to prevent pressure build-up throughout the entire pipeline. The pressure isolation device is configured to automatically switch to a shutoff state as a function of pipeline pressure, without the need for human input and without the need for electrical or hydraulic systems.

In one aspect of some embodiments, a pressure isolation device includes a housing having an internal chamber. The internal chamber has a first opening (i.e., a first inlet), a second opening (i.e., a second inlet), and a third opening (i.e., a first outlet). The device also includes an elongated member disposed within the internal chamber. The elongated member is movable (e.g., slidable) between a first position (e.g., an open position) and a second position (e.g., a closed position or a shutoff position). The elongated member is biased towards the first position (e.g., via a spring, pressured chamber, or some other suitable biasing member).

The elongated member comprises a first piston, a first catch, and a through hole disposed on the first piston. In the first position (e.g., the open position) the internal chamber's second opening is fluidly coupled to the third opening via the piston's through hole whereas the first opening is fluidly decoupled from the third opening. The fluid coupling of the second opening and the third opening allows a fluid to flow from one pipe segment to another pipe segment.

In the open position the first opening is fluidly coupled with the internal chamber of the housing such that an increase in pressure in the internal chamber will eventually overcome the elongated member's bias for the open position, and push the elongated member into the second position (e.g., the shutoff position). In the shutoff position, the second opening is fluidly decoupled from the third opening whereas the first opening remains fluidly coupled with the internal chamber.

In one aspect of some embodiments, the housing of the pressure isolation device has three adjacent internal chambers. The first chamber is coupled with the second chamber via a first chamber opening and the second chamber is coupled with the third chamber via a second chamber opening. The first chamber has a first inlet, a second inlet, and a first outlet.

In such embodiments, the elongated member includes a catch (e.g., a large diameter section) disposed in the second chamber and a piston disposed in the first chamber. The elongated member is movable between a first position (e.g., open position) and a second position (e.g., a closed position or a shutoff position) and is biased towards the first position. In the first position, a through hole on the piston fluidly couples the second inlet with the first outlet. The remaining body of the piston fluidly decouples the first inlet with the first outlet. In the second position, the piston fluidly decouples the second inlet and the first outlet, and at least part of the catch mates with the second chamber opening.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3d is a close-up of FIG. 3a.

DETAILED DESCRIPTION

One should appreciate that the disclosed devices provide many advantageous technical effects including an overpressure protection system that is cost effective and low maintenance.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
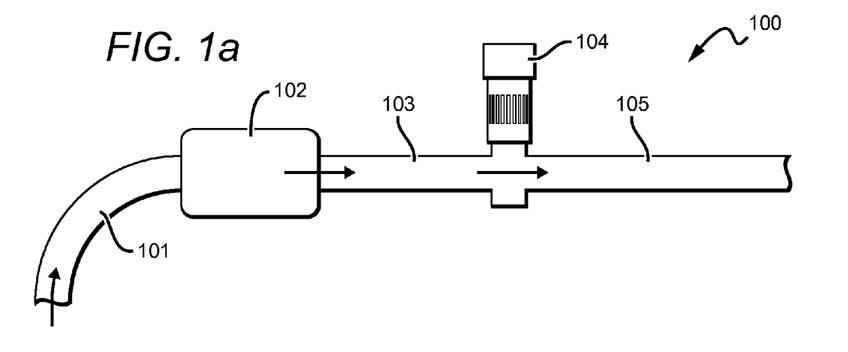
FIG. 1a is a schematic of a pipeline system with a pressure isolation device.

FIG. 1a shows a pipeline system 100 for transporting a fluid. System 100 comprises a first pipe segment 101, a pump 102, a second pipe segment 103, a pressure isolation device 104, and a third pipe segment 105. Pump 102 creates a pressure difference that pulls the fluid from pipe segment 101 into pump 102 and pushes the fluid into pipe segment 103. The fluid flows through pressure isolation device 104 and into pipe segment 105.

Figure 1B:
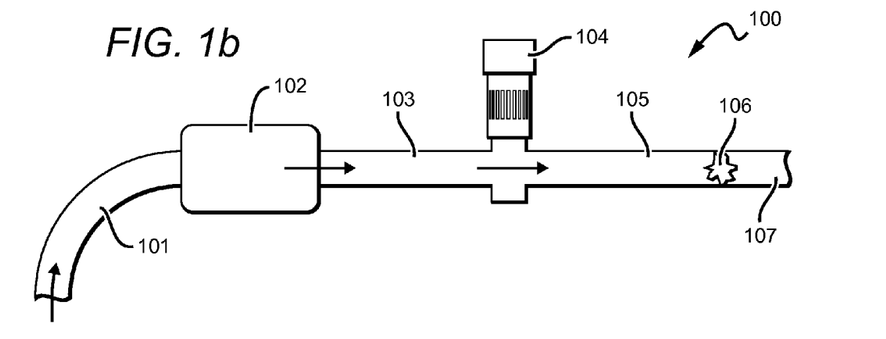
FIG. 1b is a schematic of the pipeline system of FIG. 1A with a blockage.

FIG. 1b shows pipeline system 100 when a blockage 106 occurs downstream of pressure isolation device 104. Blockage 106 prevents fluid from flowing further down stream into pipe segment 107 and causes a pressure buildup between blockage 106 and pump 102. Once the pressure builds up to a predetermined threshold, pressure isolation device 104 changes from an open position to a closed position (e.g., shutoff position). In the closed position, pressure isolation device 104 prevents fluid from flowing into pipe segment 105 and isolates downstream segments and components from the pressure buildup.

Figure 2:
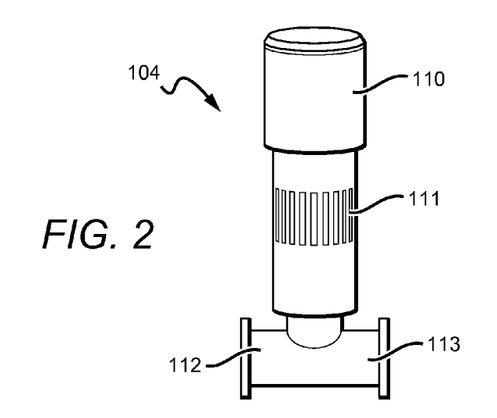
FIG. 2 is a perspective view of one embodiment of a pressure isolation device.

FIG. 2 shows pressure isolation device 104 apart from system 100. Pressure isolation device 104 comprises a housing 110 having vents 111. Housing 110 also has a first flanged pipe segment 112 (i.e., a main inlet) and a second flanged pipe segment 113 (i.e., a main outlet) that couple with pipe segments 103 and 105, respectively. The flanges of segments 112 and 113 are screwed to flanges on segments 103 and 105 (not shown) to provide a secure and fluid connection. Couplings for pipe segments are well known and the inventive subject matter is not limited to any particular coupling. In alternative embodiments, device 104 could couple with pipe segments 103 and 105 using threaded engagements, male-female engagements, snap fittings, clamps, adhesives, welds, or any other coupling suitable for providing a secure and fluid connection under the required specifications (e.g., temperature, pressure, corrosivity, etc.).

Figure 3A:
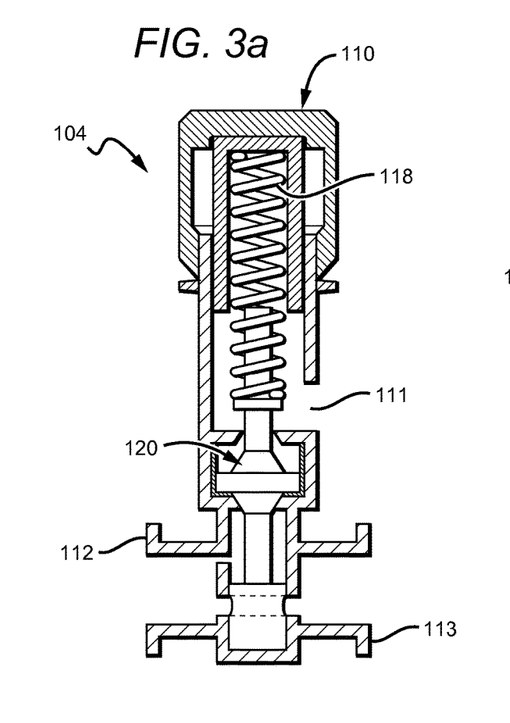
FIG. 3a is a cross sectional view of the pressure isolation device of FIG. 2.

FIG. 3a shows a cross sectional view of pressure isolation device 104. Disposed within housing 110 of device 104 is an elongated member 120 and a spring 118. Elongated member 120 is slidably disposed within housing 110 and is biased downwards in a first position (i.e., an open position) by spring 118.

Figure 3B:
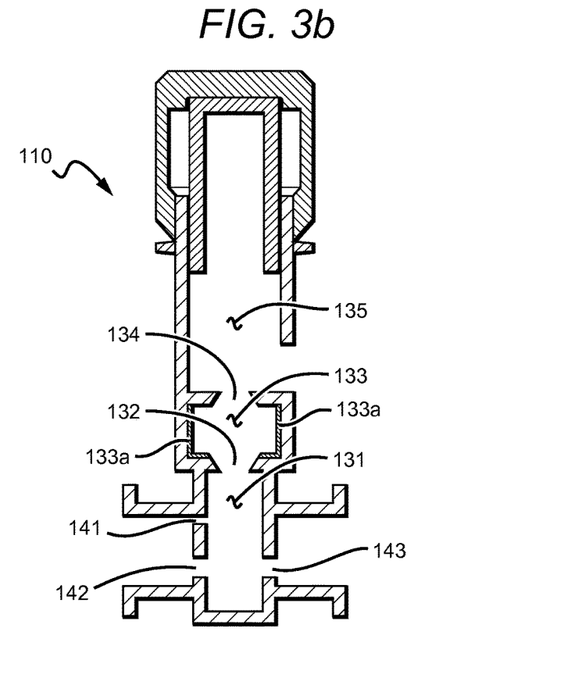
FIG. 3b is a cross sectional view of the housing of the pressure isolation device of FIG. 2.

FIG. 3b shows housing 110 with elongated member 120 and spring 118 removed. Housing 110 has a first internal chamber 131, a second internal chamber 133, and a third internal chamber 135. Chambers 131 and 133 are separated by an opening 132 and chambers 133 and 135 are separated by an opening 134.

First chamber 131 has a first opening 141, second opening 142, and a third opening 143. Openings 141 and 142 operate as first and second inlets, respectively. Opening 143 operates as a first outlet.

Housing 110 can be made of any material suitable for withstanding the conditions of the pipeline application (e.g., temperature, pressure, corrosivity, etc.). Examples of contemplated materials include, but are not limited to, metal alloys, polymers, composites, and ceramics.

Figure 3C:
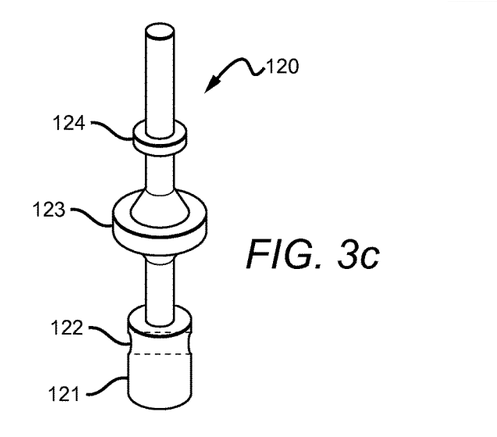
FIG. 3c is a perspective view of the elongated member of the pressure isolation device of FIG. 2.

FIG. 3c shows elongated member 120 apart from pressure isolation device 104. Elongated member 120 has a piston 121 at one of its ends. Piston 121 has a through hole 122. Elongated member 120 also has a catch 123 and a catch 124. Catch 123 has two frustoconical plugs (i.e., trapezoidal cross sections) on each side for engaging openings 132 and 134. Openings 132 and 134 are tapered such that they engage the plugs of catch 123 to provide a substantial seal (i.e., openings 132 and 134 have trapezoidal cross sections that are concentric with cross sectional portions of the plugs on catch 123), and more preferably a complete seal. As used herein, "substantial seal" and "fluidly decoupling" mean fluid flow is greatly inhibited, although not necessarily completely eliminated, under a given set of conditions (e.g., pressure, temperature viscosity, fluid flow type, etc.). As used herein, "concentric" means to have a common center or common shape.

When elongated member 120 is disposed in housing 110, piston 121 is disposed in internal chamber 131, catch 123 is disposed in internal chamber 133, and catch 124 is disposed in internal chamber 135. Elongated member 120 has a length that is shorter than the internal length of housing 110, which allows elongated member 120 to slide within housing 110. Elongated member 120 is appropriately sized and dimensioned to slide a specific distance between a closed position and an open position within housing 110.

Piston 121 is appropriately sized and dimensioned in relation to internal chamber 131 such that, when elongated member 120 is in the open position, fluid flows from pipe segment 112 to pipe segment 113 through opening 122. However, when elongated member 120 is in the closed position, the size and dimension of piston 121 in relation to internal chamber 131 blocks flow from segment 112 to segment 113.

Internal chamber 133 has a sealing surface 133*a* that mates with the circumferential surface of catch 123 in such a manner that a fluid seal is maintained while elongated member 120 slides between open and closed positions. Slidable sealing surfaces are known and could comprise any material and configuration suitable for providing a sliding seal under the particular conditions of pipeline system 100. Metals, polymers, fiber-reinforced composites, ceramics, and elastomers are examples of materials that may be used to provide a sliding sealing surface.

Pipeline conditions will vary depending on numerous factors such as the characteristics of the fluid being transported (e.g., viscosity, density, corrosivity), the capacity of the pump (e.g., maximum pressure output), elevation changes in the pipeline, and environmental temperatures and conditions (e.g., earthquakes). The inventive concepts described herein can be applied to any set of pipeline conditions and any fluid. Contemplated fluids include, but are not limited to: water, crude oil, natural gas (liquid or vapor), and absorbent slurries for treating flue gas.

The various structural features of elongated member 120 and housing 110 will now be explained in relation to the operation of pressure isolation device 104.

Figure 4A:
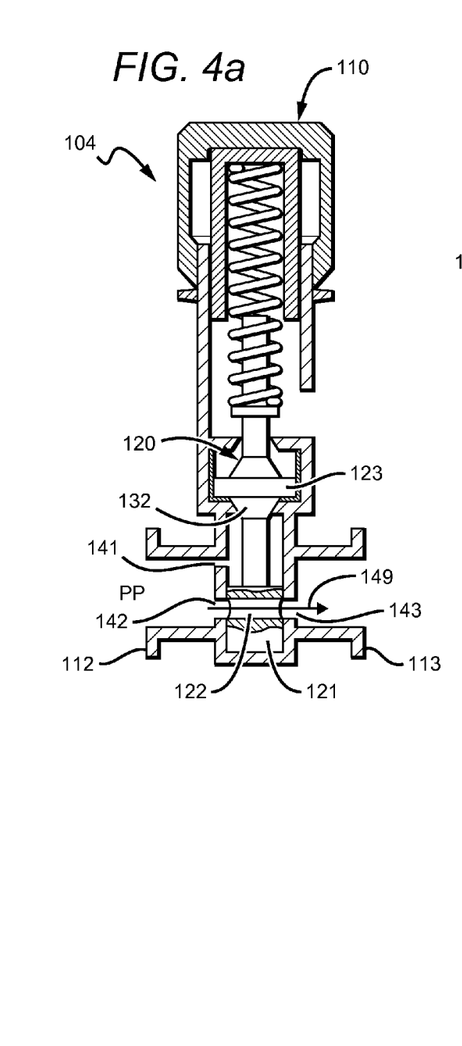
FIG. 4a is a cross sectional view of the pressure isolation device of FIG. 2 in an open position.

FIG. 4*a* shows pressure isolation device 104 in a first position, referred to as the open position. In the open position, through hole 122 on piston 121 of elongated member 120 is aligned with opening 142 and 143, allowing a fluid to flow from pipe segment 112 to 113 (see flow path 149). Elongated member 120 is sized and dimensioned such that opening 141 is decoupled from opening 143 when elongated member 120 is in the open position. Spring 118 engages catch 124, pushing elongated member downward until the end of piston 121 contacts the interior bottom surface of internal chamber 131. In addition, the lower plug of catch 123 contacts opening 132 to provide a seal that fluidly decouples internal chamber 131 from internal chamber 133. Catch 123 and opening 132 have complementary (i.e., concentric) frustoconical surfaces to provide a gradual sealing engagement as elongated member 120 is forced downward by spring 118.

As the pressure in pipeline system 100 increases due to blockage 106 downstream of pressure isolation device 104, the pipeline pressure upstream of blockage 106 increases. Once the pipeline pressure researches a predetermined threshold, the pipeline pressure will surpass the downward force provided by spring 118 and the weight of elongated member 120. As a result, elongated member 120 will be pushed upward into the second position, referred to as the closed position or shutoff position (see FIG. 4*b*).

Figure 3D:
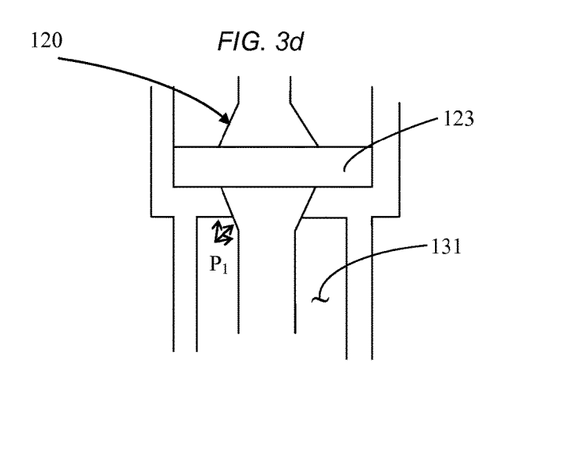
Figure 3E:
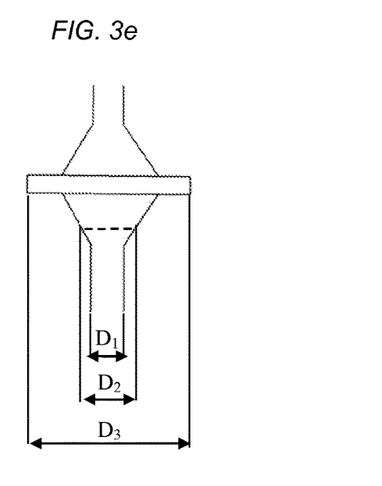
FIG. 3e is a close up of the elongated member in FIG. 3d.
Figure 3F:
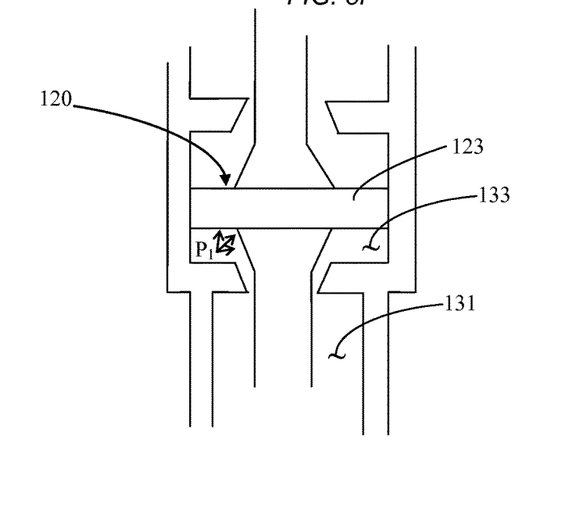
FIG. 3f is a close-up of the pressure isolation device of FIG. 3a, showing the elongated member in a transitional state.
Figure 3G:
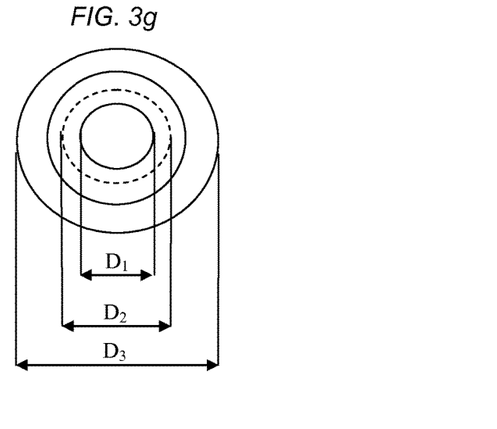
FIG. 3g is a side view of the elongated member section shown in FIG. 3e.

The force required to surpass the force of spring 118 and the weight of elongated member 120 can be approximated as follows:

$$F_u = P_1 A$$

where $F_u$ is the upward force provided by the pipeline pressure, $P_1$ is the pipeline pressure, and A is the effective area (i.e., the area upon which the pipeline pressure acts to move elongated member 120 upward). FIG. 3*d* shows a close-up view of elongated member 120 being acted upon by pipeline pressure $P_1$. The effective area (A) is a portion of the lower frustoconical plug of catch 123 that is exposed to $P_1$, which can be approximated as a planar two-dimensional surface area, as follows:

$$A = \frac{\pi}{4}(D_2 - D_1)^2$$

where $D_1$ and $D_2$ are the diameters of two cross sections of elongated member 120 as shown in FIGS. 3*e* and 3*g*. More specifically, $D_2$ is the cross sectional diameter of elongated member 120 at the first point where the lower frustoconical plug of catch 123 is exposed to $P_1$.

Those of ordinary skill in the art will appreciate that the effective area can also be calculated by taking into account the three dimensional geometry of elongated member 120. Those of ordinary skill will also appreciate that alternative embodiments of elongated member 120 that have different geometries, will likewise have different equations for calculating the effective area (and thus the force provided by $P_1$).

When the upward force ($F_u$) provided by the pipeline pressure ($P_1$) surpasses the downward forces (e.g., force of spring 118, weight of elongated member 120), elongated member 120 will start to move upward. As a result, the pipeline fluid will flow into internal chamber 133 and the size of the effective area will change, as shown in FIG. 3*f*. The new effective area can be approximated as a planar two-dimensional area, as follows:

$$A = \frac{\pi}{4}(D_2 - D_1)^2$$

where $D_1$ and $D_3$ are the diameters of two cross sections of elongated member 120 as shown in FIGS. 3*e* and 3*g*. As long as the upward force ($F_u$) remains greater than the downward force, elongated member 120 will move upward and into the shutoff position.

In alternative embodiments, spring 118 can provide a variable force rather than a constant force, in order to match the variation in upward force (e.g., the variation in effective area). For example, since the effective area increases and thus the upward force increases as elongated member 120 moves upward, spring 118 could be configured to provide a downward force that increases at a variable rate as spring 118 is compressed. In embodiments in which the downward force is provided by pressurizing internal chamber 135 rather than by a spring, a variable downward pressure can be provided by (i) including a constituent in the pressurized gas that changes phases (e.g., gas-to-liquid) during compression, (ii) applying an external heat exchanger to internal chamber 135, or (iii) using any other known method.

Figure 4B:
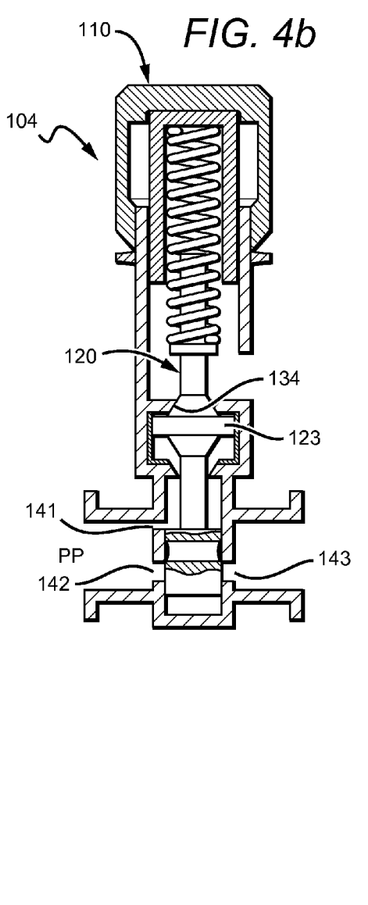
FIG. 4b is a cross sectional view of the pressure isolation device of FIG. 2 in a closed position.

FIG. 4*b* shows pressure isolation device 104 in the shutoff position. In this position, through hole 122 is no longer aligned with openings 142 and 143 and fluid flow path 149 is now blocked. However, opening 141 remains fluidly coupled with internal chamber 131 and the pressure of internal chamber 131 is equal to the upstream pipeline pressure. Catch 123 is in contact with opening 134, preventing elongated member 120 from sliding any further upwards. The contact also provides a seal that fluidly decouples internal chamber 133 from internal chamber 135 and contains fluid within the pipeline (i.e., there are substantially no emissions from device 104).

Housing 110 also has a vent 111. Vent 111 maintains the pressure within inner chamber 135 equal to atmospheric pressure. In the event that the seal between catch 123 and sealing surface 133a fails, vent 111 prevents pressure from building up in inner chamber 135 by letting fluid flow out of pressure isolation device 104. Vent 111 helps to prevent inner chamber 135 from structural damage that can be caused by over-pressurization.

In the shutoff position, pressure isolation device 104 isolates downstream pipe segment 105 from being exposed to pressures above the predetermined threshold. Pipeline components upstream of device 104 (e.g., pump 102, pipe segment 103) are configured to withstand the maximum pressure output of pump 102. For example, pipe segment 112 is made of a higher strength material and has a greater thickness than pipe segment 113, since pipe segment 112 is exposed to higher pressures than pipe segment 113. Once blockage 106 is removed, pressure isolation device 104 can be returned to the open position to resume fluid flow, either manually or automatically (i.e., by letting the upstream pressure fall below the threshold pressure).

In some applications, normal pipeline operating pressure is 2400 psig and the pump is a centrifugal compressor with a maximum pressure output of 3000 psig (i.e., deadhead pressure). The pressure isolation device is configured to switch from the open position to the closed position at about 2400 psig (e.g., the spring constant, spring length, weight/shape of the elongated member, design of the housing, and other relevant parameters are all specifically selected to provide a threshold pressure of about 2400 psig). As such, pipeline segments and components located downstream of the pressure isolation device are designed to withstand up to about 2500 psig whereas upstream components are designed to withstand up to about 3100 pressure.

Figure 5:
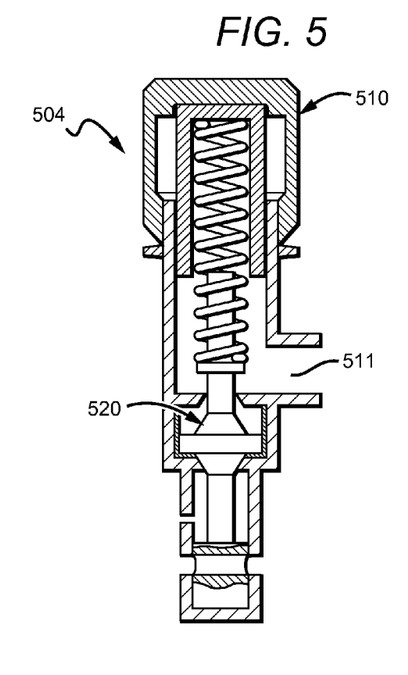
FIG. 5 is a cross sectional view of another embodiment of a pressure isolation device.

Those of ordinary skill in the art will appreciate that numerous variations of device 104 can be employed without departing from the general inventive subject matter. For example, FIG. 5 shows a pressure isolation device 504. Device 504 is similar to device 104 except that device 504 lacks a first flanged pipe segment 112 and a second flanged pipe segment 113. Instead, device 504 is coupled with a pipeline system via a welding between an outer surface of housing 510 and an opening in a pipe segment of a pipeline system (not shown).

Device 504 also differs from device 104 in that device 504 has a pipe segmented vent 511. Vent 511 can be used to connect another pipe segment for the purposes of receiving pipeline fluid in the event that the seal between elongated member 520 and housing 510 fails.

Figure 6:
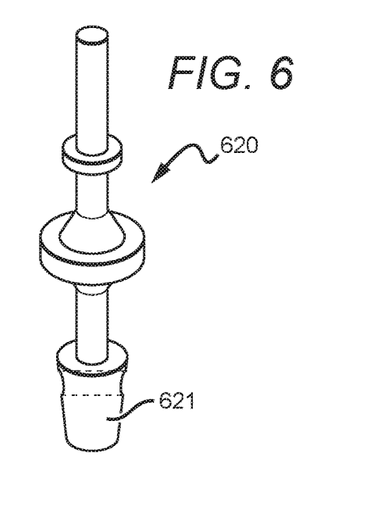
FIG. 6 is a perspective view of another embodiment of an elongated member for a pressure isolation device.

FIG. 6 shows an alternative embodiment for an elongated member. Elongated member 620 is similar to elongated member 120 except that elongated member 620 has a tapered piston 621. Tapered piston 621 is shaped to engage a tapered internal chamber (not shown) of a housing for a pressure isolation device.

Figure 7A:
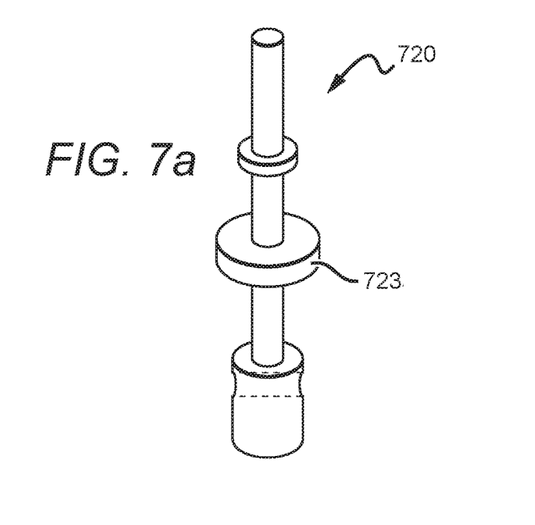
FIGS. 7a and 7b are perspective and cross sectional views, respectively, of an elongated member and a housing for another embodiment of a pressure isolation device.
Figure 7B:
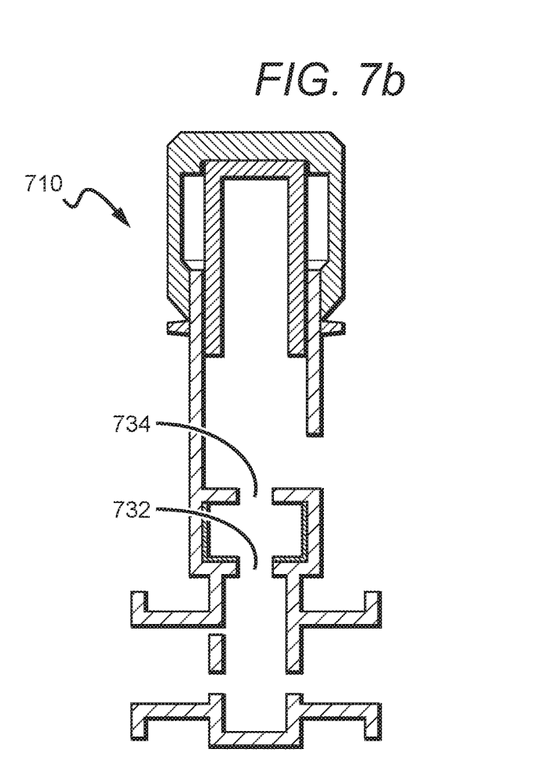

FIGS. 7a and 7b show another alternative embodiment of a pressure isolation device. FIG. 7a shows an elongated member 720, which has a catch 723. Unlike catch 123 of elongated member 120, catch 723 is disc shaped and does not have frustoconical sides (i.e., plugs). Openings 732 and 734 of housing 710 are straight rather than tapered. The flat sides of openings 732 and 734 engage the flat sides of catch 723 to provide a fluid seal.

Figure 8A:
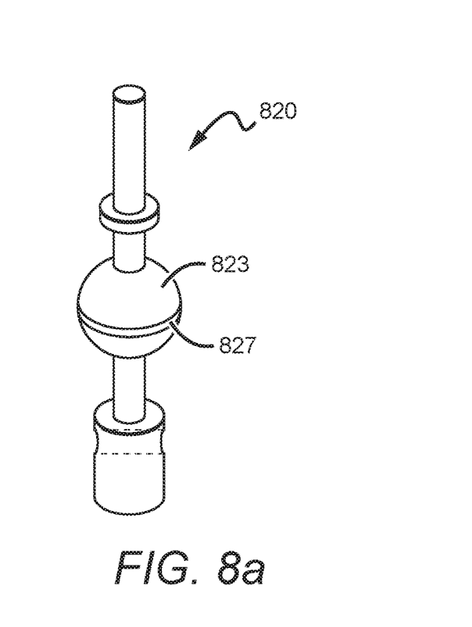
FIGS. 8a and 8b are perspective and cross sectional views, respectively, of an elongated member and a housing for another embodiment of a pressure isolation device.
Figure 8B:
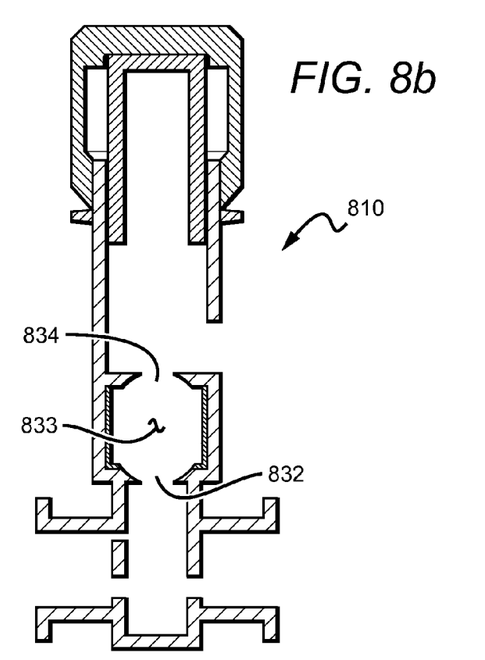

FIGS. 8a and 8b show yet another embodiment of a pressure isolation device. FIG. 8a shows an elongated member 820 having a spherical catch 823. Internal chamber 833 of housing 810 has an elongated spherical shape that allows catch 823 to sealably slide within chamber 833. Catch 823 has a sliding and sealing surface 827 that assists in maintaining a fluid seal between catch 823 and internal chamber 833 while elongated member 820 is in motion. The upper and lower spherical surfaces of catch 823 are concentric with openings 834 and 832, respectively, and mate together to provide a fluid seal when elongated member 820 is in the closed and open positions.

Figure 9:
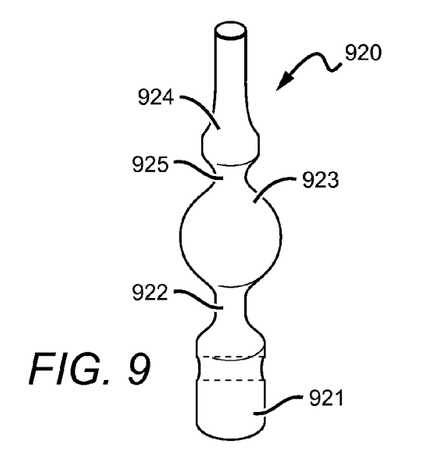
FIG. 9 is a perspective view of yet another embodiment of an elongated member.

FIG. 9 shows an elongated member 920, which has a piston portion 921, a first catch portion 923, and a second catch portion 924. These three portions have local maximum diameters and are separated from one another by small diameter portions 922 and 925. Since the change in diameter of elongated member 920 is gradual, the exact start and end point of piston 921, catch 923, and catch 924 is difficult to determine. Nonetheless, each portion of elongated member 920 has sufficient structural features to perform their required function. For example, catch 924 is large enough to engage a spring to provide elongated member 920 with a force such that it is biased in an open position within a housing of a pressure isolation device (not shown). Catch 923 is large enough to slidably and sealably engage an internal chamber of a housing. Piston 921 is large enough to fluidly decouple a first outlet from a first outlet, and also fluidly couple a second inlet with the first outlet.

Figure 10:
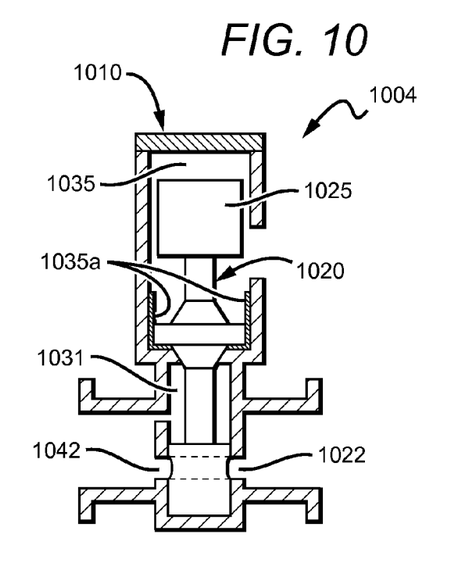
FIG. 10 is a cross sectional view of a spring-less pressure isolation device.

FIG. 10 shows a spring-less embodiment of a pressure isolation device. Pressure isolation device 1004 has an elongated member 1020 that has a weighted portion 1025. Device 1004 is attached to a pipeline system (not shown) and oriented in a field of gravity such that the weight and shape of elongated member 1020 (i.e., force and area) provides sufficient pressure to define the threshold pressure of the pipeline system. When a blockage occurs in the pipeline system and the pressure passes this threshold, the weight of elongated member 1020 is overcome and elongated member 1020 is pushed upward until weighted portion 1025 contacts the top of internal chamber 1035. The specific distance traveled by elongated member 1020 between the open and closed position is determined by the difference in lengths of elongated member 1020 and the internal chambers of housing 1010. Internal chamber 1035 preferably has a sliding sealing surface 1035a that is at least as long as the distance traveled by elongated member 1020. In addition, the distanced traveled by elongated member 1020 is at least as long as the diameter of the fluid path flow (in this case, the diameter of opening 1042 and through hole 1022).

Unlike the housings of previously described pressure isolation devices, housing 1010 has only two internal chambers (i.e., internal chamber 1031 and internal chamber 1035).

Figure 11:
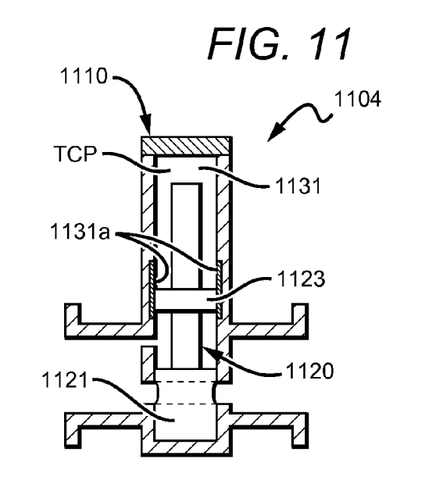
FIG. 11 is a cross sectional view of another embodiment of a spring-less pressure isolation device.

FIG. 11 shows another spring-less pressure isolation device. Pressure isolation device 1104 has a housing 1110 and an elongated member 1120. Housing 1110 has only one internal chamber, namely, internal chamber 1131. Elongated member 1120 has a first piston 1121 and a second piston 1123. First piston 1121 functions in a manner similar to piston 121 of pressure isolation device 104 (see FIGS. 4a and 4b). Second piston 1123, however, differs from catch 123 and 723 in that piston 1123 does not sealably engage an internal chamber opening. Instead, piston 1123 slides freely from open to closed positions. At least a portion of the surfaces of internal chamber 1131 includes a sealing surface 1131a that slidably and sealably engages second piston 1123. Second piston 1123 divides internal chamber 1131 into two fluidly decoupled sub-chambers; a top sub-chamber and a sub-bottom chamber. The top sub-chamber has been pressurized with a gas such as air. The pressure of the top sub-chamber (TCP) in combination with the weight and shape of elongated member 1120 defines the predetermined threshold pressure. When a blockage in a pipeline occurs and the pipeline pressure passes the threshold pressure, elongated member 1120 is forced upward a specific distance until pipeline flow through pressure isolation device 1104 is blocked. The distance traveled by elongated member 1120 is defined by the difference in the length of elongated member 1120 and internal chamber 1131.

Some of the advantages of the inventive pressure isolation devices will now be discussed. First, contemplated pressure isolation devices provide an automatic shutoff valve for isolating downstream pipe segments and components. The downstream segments and components are thus protected from damage that can result from over-pressurization. Second, unlike complex and expensive HIPPS, the contemplated pressure isolation devices are simple, economical, and principally rely on mechanical principles. Third, unlike PSV's, contemplated pressure isolation devices contain the fluid within the pipeline system (i.e., no emissions), thus eliminating environmental harm and fluid waste. Fourth, contemplated devices require little maintenance and testing. Fifth, the inventive pressure isolation devices are a dependable solution and do not require power, instrument air, or an actuator. Finally, these devices can be used as a backflow preventer in gas feed manifolds.

Those of skill in the art will appreciate that many other alternative embodiments can be employed without departing from the inventive concepts discussed herein. In addition, pipeline systems can include multiple pressure isolation devices with different threshold pressures to protect pipeline components with different ratings and specifications.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A pressure isolation device comprising: a housing having an internal chamber, a first opening, a second opening, and a third opening; an elongated member disposed within the internal chamber and movable between a first position and a second position, and biased towards the first position, and wherein the elongated member is disposed within the internal chamber such that the first opening is disposed between the first piston and the second piston; wherein the elongated member comprises a first piston, a second piston, and a through hole disposed through the first piston; wherein the first piston is sized and dimensioned to contact a surface of the internal chamber; wherein the second piston is sized and dimensioned to contact a surface of the internal chamber to substantially seal a first portion of the internal chamber from a second portion of the internal chamber; wherein, when the elongated member is in the first position, the through hole is positioned so as to fluidly couple the second opening and the third opening; and wherein, when the elongated member is in the second position, the first piston substantially seals the second opening and the third opening.

2. The pressure isolation device of claim 1, wherein the elongated member travels a distance from the first position to the second position.

3. The pressure isolation device of claim 2, wherein the distance is limited by a difference in length between the elongated member and the internal chamber.

4. The pressure isolation device of claim 3, wherein the distance in length between the elongated member and the internal chamber is at least as large as an internal diameter of the through hole.

5. The pressure isolation device of claim 1, further comprising a spring coupled with an end of the elongated member and configured to bias the elongated member towards the first position.

6. The pressure isolation device of claim 1, wherein the second portion of the internal chamber is fluidly coupled with the first opening.

7. The pressure isolation device of claim 6, wherein the first portion of the internal chamber is pressurized such that the elongated member is biased towards the first position.

8. The pressure isolation device of claim 1, wherein the first piston and the second piston each provides slidable sealing contact with a surface of the internal chamber for fluidly decoupling portions of the internal chamber.

9. A pressure isolation device comprising: a housing comprising a first chamber, a second chamber, and a third chamber, wherein the first and second chambers are separated by a first opening and the second and third chambers are separated by a second opening; an elongated member having a first portion and a second portion separated by a first catch; a through hole disposed on the first portion of the elongated member: wherein the first chamber comprises a first inlet, a second inlet, and a first outlet; wherein the elongated member is at least partially disposed within the housing, and is movable between a first position and a second position and biased towards the first position; wherein the first portion is at least partially disposed within the first chamber such that: when the elongated member is in the first position, the through hole fluidly couples the second inlet and the first outlet and at least part of the first catch mates with the first opening; and when the elongated member is in the second position, the first portion substantially seals the second inlet and the first outlet, and at least part of the first catch mates with the second opening.

10. The pressure isolation system of claim 9, wherein the first catch comprises a disc, a first plug, and a second plug.

11. The pressure isolation system of claim 10, wherein the first plug is frustoconical and the first opening is frustoconical and concentric with a portion of the first plug.

12. The pressure isolation system of claim 9, wherein the first catch comprises a sphere, and wherein the first opening has a curved profile and is concentric with a portion of the sphere.

13. The pressure isolation system of claim 9, further comprising a spring coupled to the second portion of the elongated member such that the elongated member is biased towards the first position.

14. The pressure isolation system of claim 9, wherein the first catch slidably and sealably contacts an inner surface of the second chamber to fluidly decouple portions of the housing.

15. The pressure isolation system of claim 9, wherein the second chamber further comprises a vent.

16. The pressure isolation system of claim 9, wherein the second portion comprises a second catch sized and dimensioned to oppose a spring.

17. The pressure isolation device of claim 9, further comprising a main inlet that fluidly couples with the first inlet and the second inlet, and a main outlet that fluidly couples with the first outlet.

18. The pressure isolation device of claim 17, wherein the main inlet has a thickness that is larger than a thickness of the main outlet.

19. The pressure isolation device of claim 17, wherein the main inlet and the main outlet each have a flange configured to couple with a pipeline flange.

20. A pressure isolation system comprising: a pipeline for transporting a fluid; a pressure isolation device disposed in the pipeline and configured to stop flow in the pipeline when the pressure isolation device is in a shutoff state, the pressure isolation device comprising: a housing having an internal chamber, a first opening, a second opening, and a third opening; an elongated member disposed within the internal chamber and movable between a first position and a second position, and biased towards the first position, and wherein the elongated member is disposed within the internal chamber such that the first opening is disposed between the first piston and the second piston; wherein the elongated member comprises a first piston, a second piston, and a through hole disposed through the first piston; wherein the first piston is sized and dimensioned to contact a surface of the internal chamber; wherein the second piston is sized and dimensioned to contact a surface of the internal chamber to substantially seal a first portion of the internal chamber from a second portion of the internal chamber; wherein, when the elongated member is in the first position, the through hole is positioned so as to fluidly couple the second opening and the third opening; and wherein, when the elongated member is in the second position, the first piston substantially seals the second opening and the third opening.

* * * * *

UNITED STATES PATENT AND TRADEMARK OFFICE
CERTIFICATE OF CORRECTION

PATENT NO.      : 9,541,210 B2
APPLICATION NO. : 13/658682
DATED           : January 10, 2017
INVENTOR(S)     : Pat F. Fetizanan It is certified that error appears in the above-identified patent and that said Letters Patent is hereby corrected as shown below:

Column 6, Line 33 " $A = \frac{\pi}{4}(D_2 - D_1)^2$ " should be " $A = \frac{\pi}{4}(D_3 - D_1)^2$ "

Signed and Sealed this
First Day of August, 2017

Joseph Matal
*Performing the Functions and Duties of the*
*Under Secretary of Commerce for Intellectual Property and*
*Director of the United States Patent and Trademark Office*